United States Patent [19]

Biaggini et al.

[11] 4,237,794

[45] Dec. 9, 1980

[54] AUTOMOBILE SECUREMENT MECHANISM TO FREIGHT CAR

[75] Inventors: Benjamin F. Biaggini, San Francisco; William M. Jaekle, Moraga; Paul V. Garin, San Francisco; Robert Byrne, San Carlos; Armand Giovanelli, San Francisco, all of Calif.

[73] Assignee: Southern Pacific Transportation Company, San Francisco, Calif.

[21] Appl. No.: 851,140

[22] Filed: Nov. 14, 1977

Related U.S. Application Data

[62] Division of Ser. No. 646,940, Jan. 6, 1976, Pat. No. 4,067,469.

[51] Int. Cl.[2] .................. B60P 7/08; B61D 45/00; B61D 49/00; B65J 1/22
[52] U.S. Cl. .............................. 410/7 R; 24/201 HE; 24/232 G; 410/69; 248/503
[58] Field of Search .......... 24/201 HE, 223, 230 BC, 24/232 G; 105/366 A, 366 B, 366 C, 366 D, 366 E, 366 R, 368 B, 368 S, 368 T, 368 R; 214/38 CC, 145 R; 248/500, 503, 503.1, 505, 506, 510; 292/238, 304; 296/35 A

[56] References Cited

U.S. PATENT DOCUMENTS

| 1,804,542 | 5/1931 | Perin | 296/35 A |
|---|---|---|---|
| 2,349,021 | 5/1944 | Truesdale et al. | 24/232 G |
| 2,525,388 | 10/1950 | Willetts | 105/368 B |
| 2,607,604 | 8/1952 | Nelson | 24/232 G X |
| 3,070,041 | 12/1962 | Gutridge | 105/366 D |
| 3,659,533 | 5/1972 | Venditty | 105/368 R |
| 3,661,098 | 5/1972 | Jaekle et al. | 105/368 R |
| 3,785,601 | 1/1974 | Kitchen, Jr. et al. | 105/368 R X |
| 3,866,542 | 2/1975 | Blunden | 105/368 R |
| 4,067,469 | 1/1978 | Biaggini et al. | 214/38 CC X |
| 4,073,394 | 2/1978 | Biaggini et al. | 214/145 R |

*Primary Examiner*—Joseph F. Peters, Jr.
*Assistant Examiner*—Howard Beltran
*Attorney, Agent, or Firm*—Phillips, Moore, Weissenberger, Lempio & Majestic

[57] ABSTRACT

Automobiles are lifted from alongside a fully enclosed multi-level deck rail car and loaded onto the decks through a side opening of the rail car. The automobiles are pushed forwardly from the rear towards an end of the rail car. Detachable securement means on the decks and the frames of the cars cooperate automatically in response to forward movement of the automobiles to compress the spring suspension systems of the automobiles and lock the automobiles to the decks to prevent longitudinal or sideward movement of the automobiles on the decks during transport.

10 Claims, 16 Drawing Figures

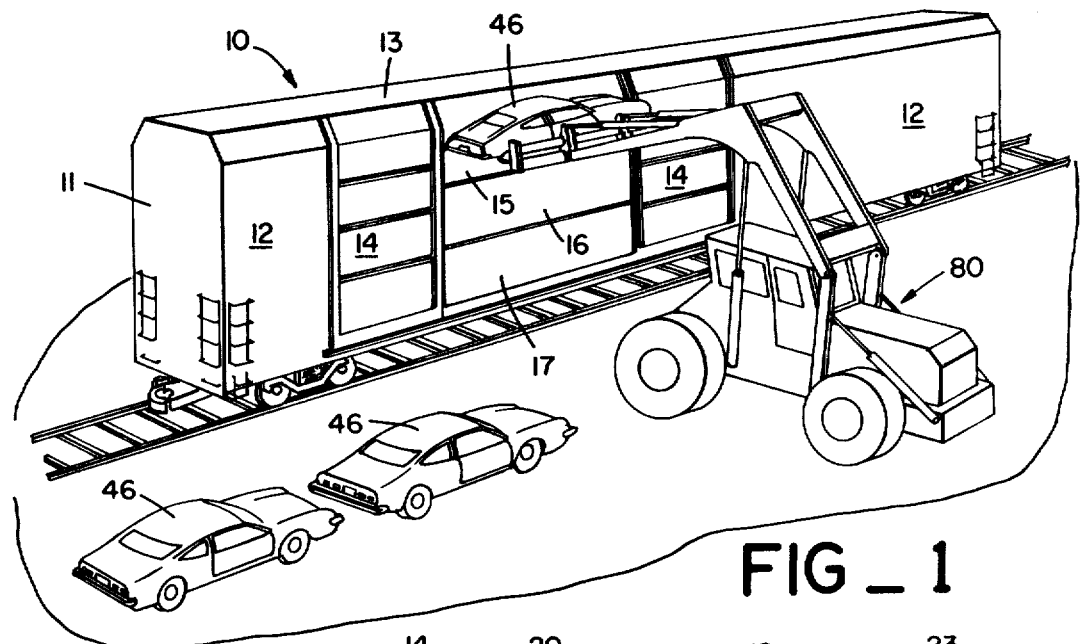
FIG_1
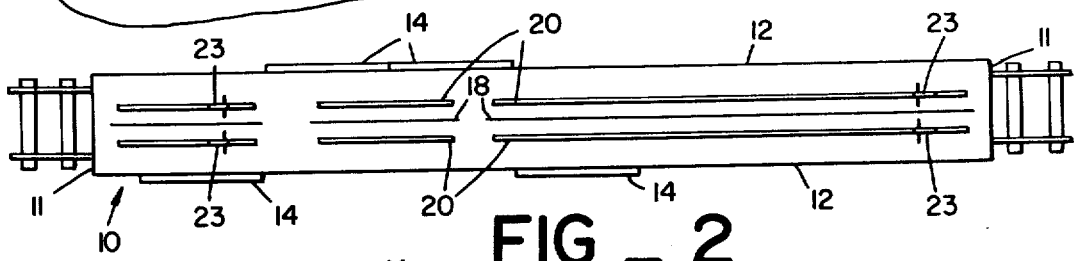
FIG_2
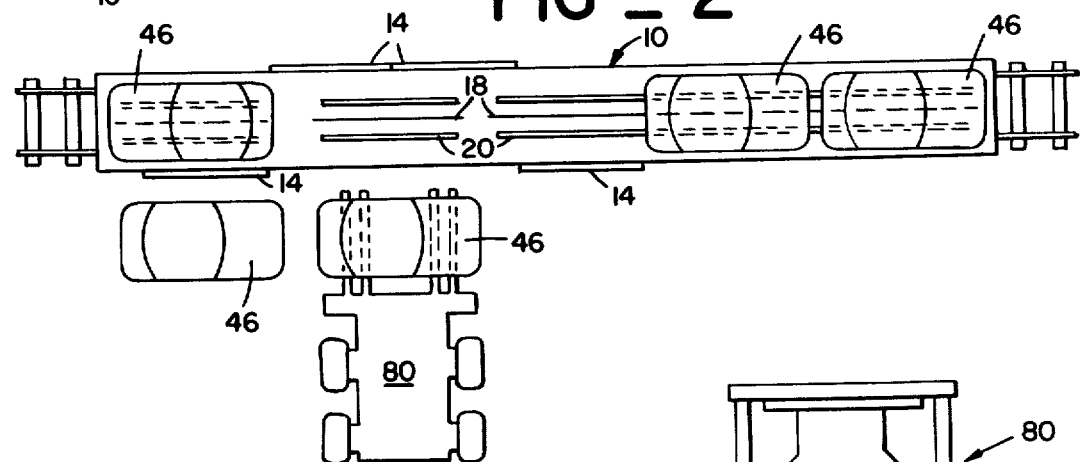
FIG_3
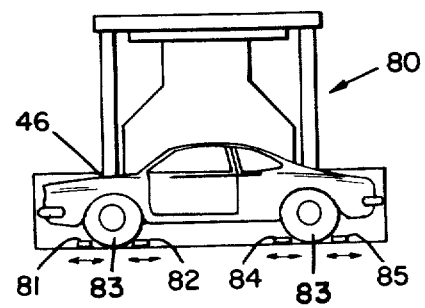
FIG_4

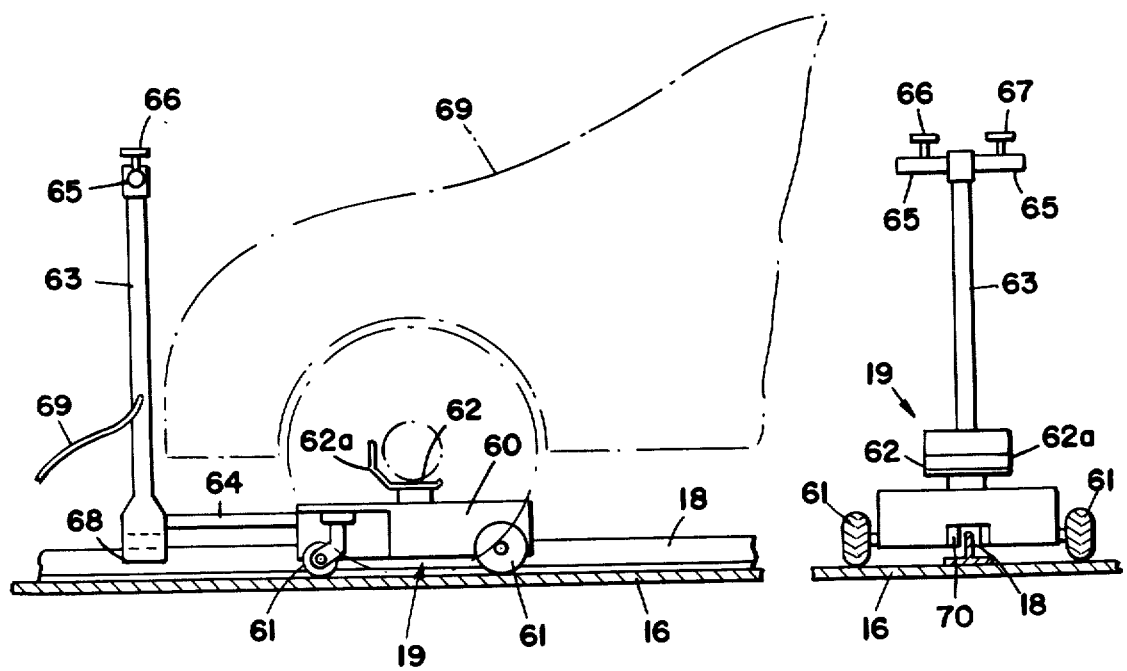
FIG_5
FIG_6
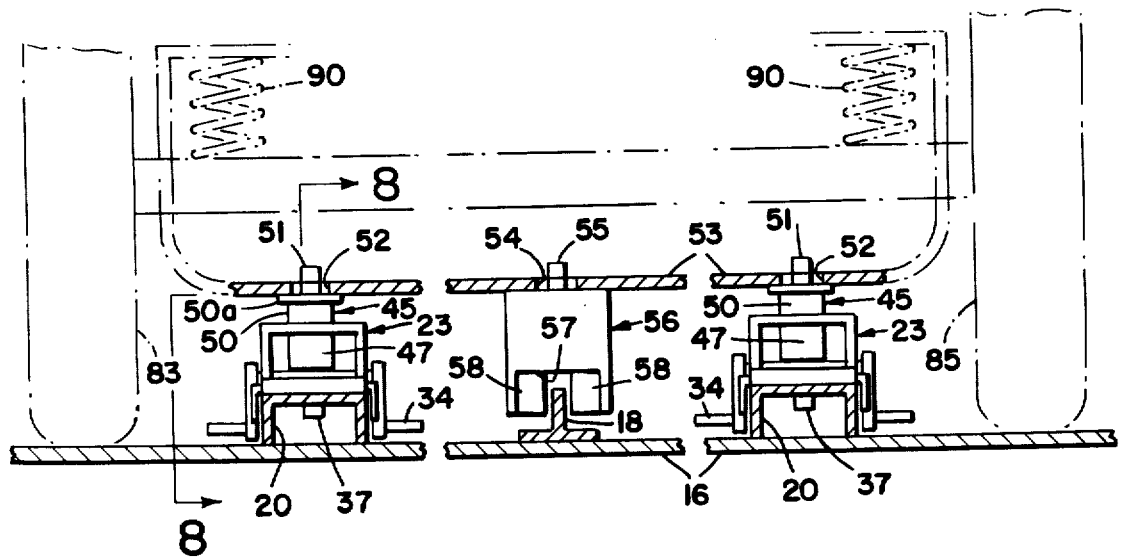
FIG_7

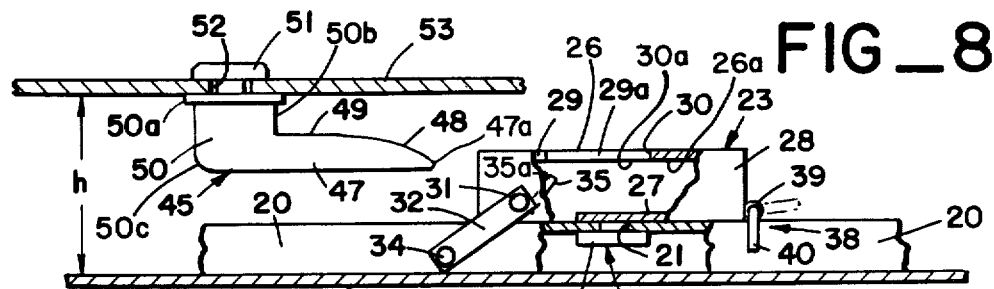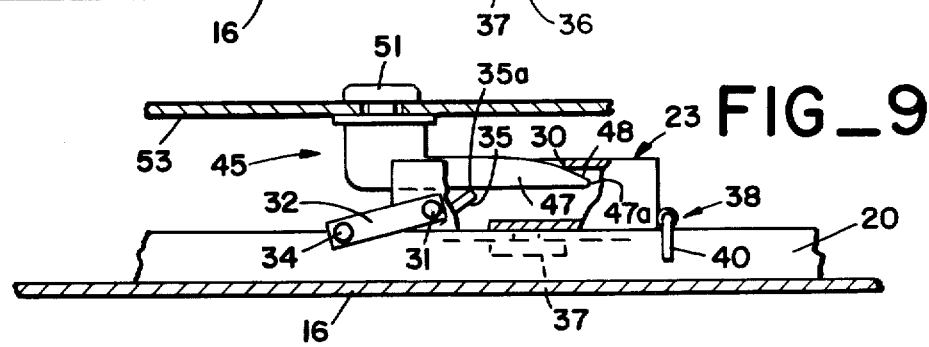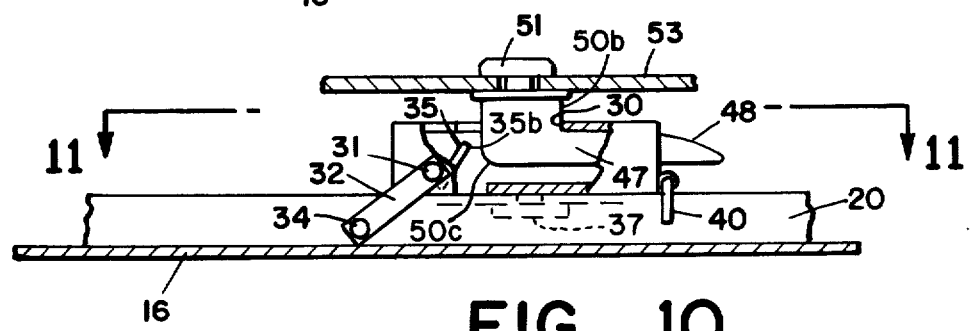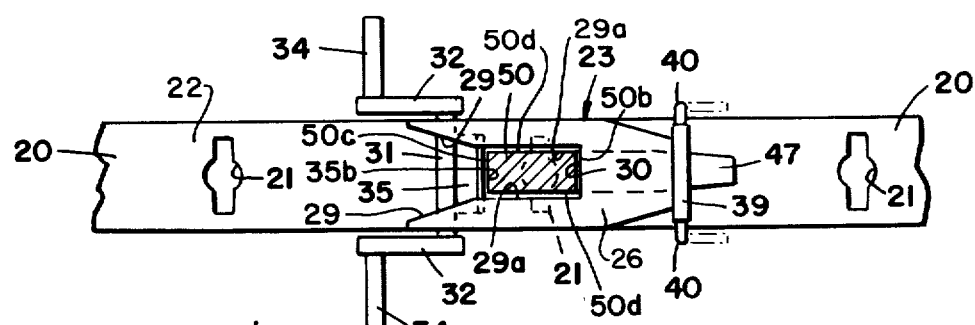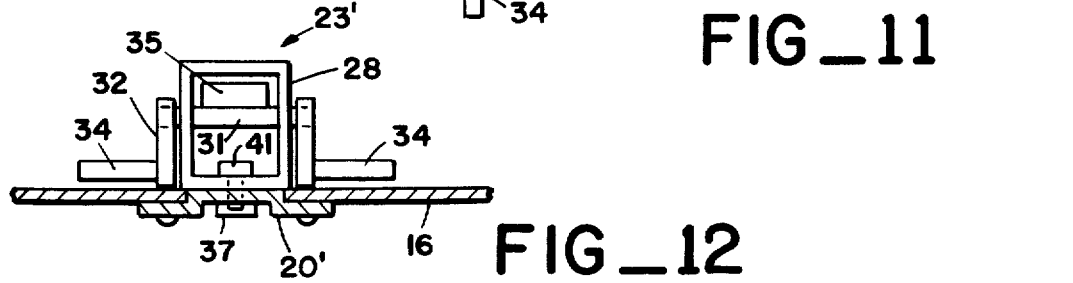

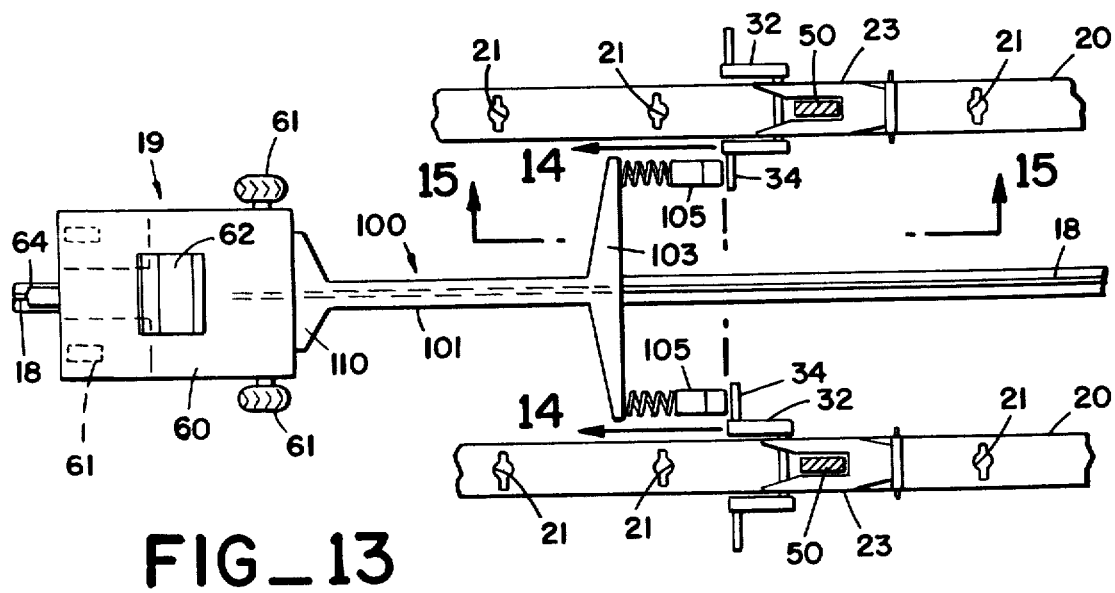
FIG_13
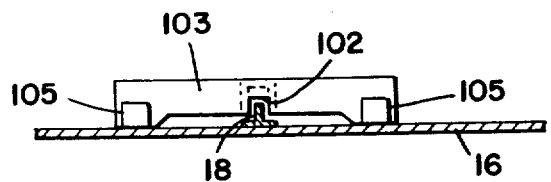
FIG_14
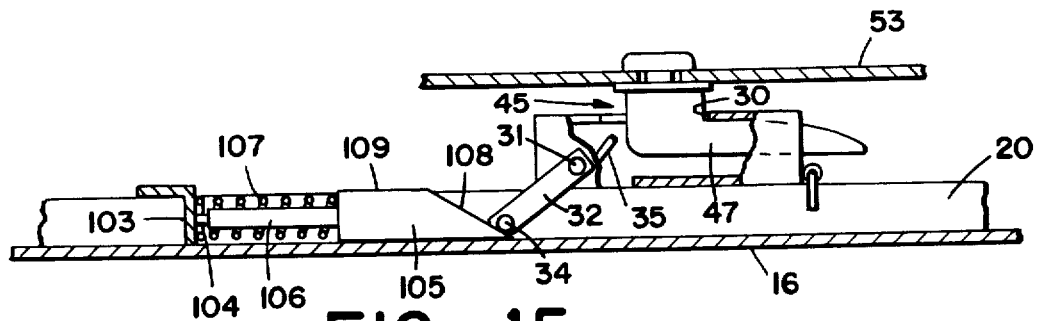
FIG_15
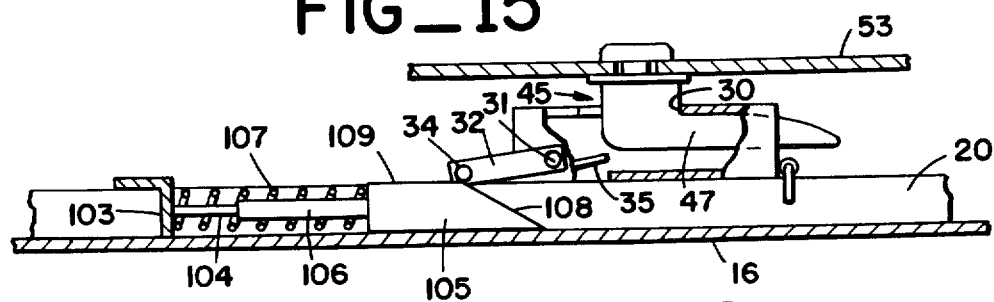
FIG_16

AUTOMOBILE SECUREMENT MECHANISM TO FREIGHT CAR

This is a division of Ser. No. 646,940, filed Jan. 6, 1976, now U.S. Pat. No. 4,067,469, issued Jan. 10, 1978.

BACKGROUND OF THE INVENTION

This invention relates to loading and unloading of automobiles into and from rail cars, particularly rail cars of the multiple-level deck design.

At present, the conventional manner of loading automobiles into multi-level deck rail cars is the "circus" method. A number of rail cars, connected end-to-end and provided with open ends, or end doors, are positioned at the loading area. Bridge plates are placed on and between same-level decks of adjacent rail cars so that the automobiles may be driven from rail car to rail car and a ramp is installed from ground level to the proper deck level of the end rail car. A squad of drivers then drive the automobiles from a marshalling area to the loading area, up the ramp and through the bridged rail cars until they come to the last automobile which has been loaded. The automobiles are parked in the rail cars and tied down in place by ratchets and chains. As each level becomes full, the end ramp is moved and positioned at a new level and the process is repeated. In essence, the presently used method is the same as filling cars into a long narrow tunnel.

One of the main desires in automobile shipment is to have the rail car space used as efficiently as possible, with the maximum number of automobiles being put into each rail car. Circus loading does provide a high degree of space utilization.

However, the present circus method of end loading rail cars has many disadvantages. Much time is required to position the bridge plates and install the end ramps. The necessary slope of the end ramps and the occasional slope of bridge plates between rail cars having decks of unequal height often causes damage to the mufflers or undercarriage of the automobiles as they are being loaded or unloaded, particularly if the driver does not try to avoid jouncing as he drives on the ramp and bridge plates.

If a long train is being loaded, considerable time will be required after each automobile has been loaded for the driver to walk back to the marshalling area to get his next automobile. Additionally, the loading personnel will be widely dispersed, making personnel supervision difficult.

Because the automobiles are driven on and off, the operation of the automobile engines during loading and unloading causes exhaust fumes to accumulate in the rail cars. This in turn increases the discomfort to the drivers and the chain installers working in the rail cars. If a battery is dead or a tire has become flat during shipment, unloading is delayed.

There is little space between the sides of the automobiles and the sides of the rail cars. As a consequence, it is easy to damage the automobile doors as the driver gets in or out. The lack of space makes it difficult for the interior workman to install the necessary tie-down chains, and the workman is apt to scratch the paint on an automobile with his tools as he squeezes by the side thereof.

Pilfering and vandalism of automobiles during shipment is an increasing concern. It is a simple matter to provide a full side covering to end-loaded rail cars, but serious difficulties have been experienced in designing practical and trouble-free bi-fold or tri-fold end doors which will allow end loading and which will completely enclose the ends of the rail car during transit.

The main objective of the present invention is to achieve the space utilization efficiency of circus loading, while avoiding the disadvantage mentioned above. In particular, the objects of the invention are three-fold:

(1) To provide maximum protection and eliminate the possibility of damage from pilferage, theft and vandalism during transit;

(2) To minimize manpower requirements, especially the necessity for drivers to get in and out of automobiles during loading and unloading operations;

(3) To reduce as far as possible damage to the automobiles during loading and unloading.

SUMMARY OF THE INVENTION

In general, the objective of the present invention is met by side loading of automobiles into a rail car having a side door opening to multiple-level decks. The rail car is thus essentially a boxcar and presents no special design problems of providing a structurally sound fully enclosed shell with trouble-free doors.

Automobiles are brought to the side of the rail car, either serially, as with circus loading, or accumulated at each rail car for batch loading. A modified forklift is used to lift the automobile to appropriate deck height, insert it through the open doorway and place it on the deck. A workman with a self-propelled air-jack immediately moves the automobile to the desired place in the rail car.

Automatically operating securement means are used, comprising hook attachments on the automobile and sockets fixed to the deck floor which operate to lock the automobile to the deck automatically when the automobile has been moved to its desired position.

The workman in the rail car never gets in or out of the automobile. Instead, the workman is positioned at all times between the end of the automobiles and the rail car door and never has to squeeze by the sides of the automobiles in the car.

Unloading operations are carried out using a reverse procedure.

Other objects and advantages of the present invention will be set forth in the following detailed description.

BRIEF DESCRIPTION OF THE DRAWING

In the drawings, forming a part of this application, and in which like parts are designated by like reference numerals throughout the same, FIG. 1 is a perspective view of a rail car being side-loaded in accordance with the invention;

FIG. 2 is a plan view of one of the decks of the rail car of FIG. 1;

FIG. 3 is a view similar to FIG. 2 during side-loading operations;

FIG. 4 is a front elevational view of the modified forklift truck used in the present invention;

FIG. 5 is a side elevational view of the self-propelled air-jack used in the present invention;

FIG. 6 is an end elevational view of the air-jack of FIG. 5;

FIG. 7 is an elevational sectional view illustrating the automobile securement means of the present invention;

FIG. 8 is a sectional view taken generally on line 8—8 of FIG. 7 showing the automobile hook attachment nearing its securement socket, with portions broken away;

FIG. 9 is a view similar to FIG. 8, showing the hook partially inserted into the socket;

FIG. 10 is a view similar to FIG. 8, showing the hook fully inserted into the socket;

FIG. 11 is a sectional view, taken on line 11—11 of FIG. 10;

FIG. 12 is an end elevational view of a modified socket designed for flush-mounted runners;

FIG. 13 is a plan view showing the securement sockets, the unlocking bar and the air-jack;

FIG. 14 is an end view of the unlocking bar, as seen from line 14—14 of FIG. 13;

FIG. 15 is a sectional view, taken on line 15—15 of FIG. 13, showing the initial step of unlocking the securement socket;

FIG. 16 is a view, similar to FIG. 15, showing the securement socket unlocked by the unlocking bar.

DESCRIPTION OF THE PREFERRED EMBODIMENT

Referring now to FIG. 1, the side loading concept of the present invention involves a standard 89-foot length rail car 10, preferably of the flat deck design, although a low-level design can be adapted to this system. The rail car superstructure is completely enclosed by ends 11, sides 12 and roof 13 except for double sliding doors 14 on each side of the car which provide a 23-foot clear door opening, exposing the three decks 15, 16 and 17 of the car. The location of the side doors is such that the mixture of automobiles, depending on size and spacing, is optimized. The car superstructure provides three decks with normal height required in tri-level automobile service. The decks are flat for standard car deck height. If low-level design is used, angle ramps will be required at each end of the lower deck 17 to clear the draft gear housing on the undercarriage of the rail car.

Each deck is provided, as in FIGS. 2, 6 and 7, with center guide rails 18 which extend longitudinally of the rail car. Gaps in the center guide rail system are provided at either end of the guide rail adjacent the doors 14 to provide room for the rail-guided self-propelled air-jack 19 to be turned around. Each deck is also provided with runners 20 parallel to and on each side of the center guide rail, the runners having key shaped slotted holes 21 (FIG. 10) along the length of the upper face 22 thereof for attachment of the securement sockets 23 to the runners. Although the runners are shown in most of the drawings as being inverted U-shaped channels with the upper face 22 spaced above the level of the deck, the runners could be flush-mounted in the deck with the upper runner face 22 being level with the deck so that the deck surface would be unobstructed, as in FIG. 12.

The securement sockets 23 comprise an elongated body having top and bottom walls 26 and 27 and side walls 28 and open at both ends. The top wall 26 is notched from one end to provide guide surfaces 29 which converge inwardly and then extend longitudinally at 29a to stop surface 30. Top wall 26 has a horizontal bearing surface 26a on the underside thereof which extends from the lower edge surface 30a of stop surface 30. A transverse shaft 31 extends across the interior of the socket close to the bottom wall 27 at the guide end of the socket, the shaft 31 extending through the side walls and having counterweight lever arms 32 fixed thereto. The lever arms each have a laterally extending horizontal stub 34 fixed thereto, the stub extending away from the center of the socket and being spaced from the free end of lever arm 32 so that when the lever arm engages the deck (FIG. 8) the stub 34 will be spaced above the deck. A locking plate 35 is fixed along one edge to shaft rod 31 inside the socket for swinging movement of the plate about the axis of shaft 31. The weights of the counterweight lever arms 32 and stubs 34 are related to the weight of the locking plate so that the locking plate system will rotate by gravity to the position illustrated in FIG. 8 wherein the lever arms engage the deck and the locking plate has its maximum upward inclination.

Socket 23 has a Tee-shaped fastener 36 fixed to the bottom thereof, the head 37 of which is spaced below the bottom wall 27 and sized relative to slots 21 in runner 20 so that the head may be passed through the slot when the socket is crosswise to the runner but not when the socket is parallel to the runner. A U-shaped retainer member 38 is mounted in tube 39 fixed to one end of the socket, the retainer member being rotatable in the tube so that the retainer member legs 40 can be moved between the dotted- and full-line positions of FIG. 8. When in the full-line position the retainer member legs 40 will engage the sides of the runner 20 so that the socket 23 will be held against rotation about the axis of Tee fastener 36 when the socket is secured to the runner.

FIG. 12 shows a modified socket 23' designed for use with a runner 20' which has its upper surface flush with deck 16. Socket 23' has higher side walls 28 which rest on the deck and support the locking plate mechanism at the same height as previously described. A Tee-fastener head 37 secure the socket to the runner 20' as before. A retractable pin 41 on the front end of the socket passes through a hole in runner 20' to prevent rotation of the socket relative to runner 20' when installed.

Sockets 23 cooperate with hook members 45 mounted underneath the automobiles 46. Hook members 45 comprise a forwardly extending prong 47 having front edge surface 47a, and an upwardly and rearwardly inclined cam surface 48 on the front end of the prong leading from the front edge surface 47a to a horizontal bearing surface 49 which extends rearwardly to shank 50. Shank 50 has a thickness slightly less than the distance between guide surfaces 29a of the socket 23 so that it will fit therebetween and will be held thereby against sidewards movement. The upper end of shank 50 has a laterally extending bearing surface 50a and a Tee-shaped fastener thereon, the head 51 of which is adapted to pass through an elongated slotted hole 52 in the frame 53 of the automobile 46, when the prong is parallel to the length of the slotted hole slot but not when the prong is crosswise thereto. The slotted holes 52 are preferably formed during the manufacture of the automobile and the location of the slotted hole will depend on the design of the automobile. For full frame vehicles, these holes could be located in the bottom of the frame at the "hard point" ahead of the rear wheels. In automobiles with steel frames, the slotted holes would be in the bottom of the stub frame near the end of the frame section. On automobiles with floor pans, the slotted holes would be provided at the most suitable location. In any event, each automobile would be provided with a pair of these slotted holes at opposed locations and on each side of and equally spaced from the longitudinal centerline of the automobile.

The automobiles will each have a similar slotted hole 54 (FIG. 7) through the frame 53 on the longitudinal centerline of the automobile near the front end thereof, for reception of the head of the Tee-shaped fastener 55 on the upper end of guide member 56 which depends therefrom. When the guide member is installed and rotated to locked position, the channel 57 through the lower end of the guide member will be aligned with the longitudinal centerline of the automobile for reception of guide rail 18 thereinto. Channel 57 is preferably formed with inwardly and rearwardly converging guide surfaces 58 to aid in guiding the channel 57 onto guide rail 18. Although FIG. 7 may tend to indicate that hook members 45 are located on the automobile at the same distance from the front of the automobile as guide member 56. However, hook members 45 are generally spaced substantially rearwardly of guide member 56.

The self-propelled air-jack 19, illustrated in FIGS. 5, 6 and 13, comprises a body 60 mounted on wheels 61 the rear ones of which are swivel-mounted for steering purposes. A vertically movable jack pad 62 is carried by the jack, the jack pad being shaped to engage the rear axle of an automobile centrally thereof and having an upwardly extending flange 62a adapted to engage the axle. Column 63 extends upwardly from the rear end of the extension arm 64, column 63 being provided at its upper end with steering handles 65 and valve knobs 66 and 67. Guide plates 68 are fixed to column 63 to form a channel into which guide rail 18 is received to prevent sidewards movement of the jack when guide plates 68 are on either side of the guide rail. Jack body 60 contains conventional air-pressure-actuated motors supplied through hose 69 from a suitable source of compressed air (not shown) for actuation of jack pad 62 by manipulation of valve knob 66 and for the driving of wheels 61 upon manipulation of valve knob 67. Jack body 60 has a longitudinal channel 70 in the bottom thereof for reception of guide rail 18 thereinto. Column 63 is spaced sufficiently rearwardly of jack pad 62 so the jack pad flange 62a engages the rear axle of the automobile and positions the jack pad 62 below the axle before the column 63 reaches the rear bumper of the automobile.

In loading operations, the automobiles 46 are driven in the usual manner from the marshalling area to a designated location at the side of the rail car 10 into which they are to be loaded. The drivers may then drive another batch of automobiles from the marshalling area to another rail car, or be released for other work assignments.

Three workmen will be used in loading the rail car—a workman inside the rail car, an operator for the forklift truck 80 and a driver to drive the automobiles at the rail car location. As the automobiles are being brought to the rail car, the inside workman and the air-jack 19 are lifted up to the first deck of the rail car to be filled and the air-jack is connected to a suitable outlet from the train's pneumatic system or from wayside air. A suitable number of securement sockets 23 will have been left in the rail car from the last shipment of automobiles and the workman will install two of these sockets on runners 20 at each end of the rail car. No tools are required for such installation. The workman will also move the air-jack 19 towards an end of the rail car and out of the way of the door opening.

The outside driver will spot the first automobile in front of the door opening, turn off the engine and set the parking brake. The forklift operator then maneuvers the forklift truck so that one of the sets of extended tines 81 and 82 are disposed on opposite sides of one of the sets of tires 83 of the automobile and the other set of tines 84 and 85 are similarly disposed relative to the other tires of the automobile. Tines 81 and 82, and also tines 84 and 85, are brought together (by suitable control mechanism not shown) so that the tines engage the front and rear of each of the tires below the axis thereof (FIG. 4). The forklift truck is then operated to lift the automobile and insert it through the rail car door (FIG. 1) and lower it onto the car deck. The inside workman assists in guiding the automobile so that the center guide 56 on the automobile will be positioned on center guide rail 18.

The hook members 45 and center guide member 56 may either have been installed on the automobile at the marshalling area, or the driver at the rail car may install them when the automobiles have been lifted up by the forklift truck.

After the automobile has been lowered onto the deck and the forklift tines have been spread and removed, the inside workman moves the air-jack under the rear of the automobile and hoists the rear axle sufficiently so that the locked rear wheels are raised slightly above the deck. The air-jack is then propelled forwardly to move the automobile towards the end of the rail car which the automobile faces, the automobile and air-jack being guided and held against sidewards movement by central rail 18. As the automobile approaches its final storage position, the prongs 47 approach sockets 23 as illustrated in FIG. 8. The hook members 45 are designed so that for an automobile having an unloaded clearance h between the deck and frame 53, the upper horizontal surface 49 is spaced above the deck by an amount greater than the height of the underside of the top wall 26 of the socket 23. Typically this difference in height may be on the order of an inch and a half.

As the automobile continues to move forwardly, prong 47 will insert itself into socket 23. The interengagement of the prong surface 47a and the surface 35a on the locking plate 35 will then cause the locking plate 35 to swing downwardly as insertion of the prong into the socket continues. The prong then moves forwardly until the inclined cam surface 48 thereof engages the lower edge surface 30a of stop surface 30 of the socket (FIG. 9). The interengaged prong and socket surfaces, 58 and 30a, will cam the prong and frame 43 downwardly as the prong continues to move forwardly, so that the spring suspension of the automobile, represented schematically at 90 in FIG. 7, is compressed. The compression of the spring suspension will increase until the horizontal bearing surface 59 of the prong reaches socket surface 30a. Continual forward movement of the prong then causes the horizontal bearing surface 59 to slide under the top wall 26 of the socket and along socket surface 26a until the vertical forward surface 50b of the prong and the vertical stop surface 30 of the socket interengage to arrest forward movement of the prong and the automobile. By this time the rear surface 50c of the prong will have cleared locking plate 35 so that it is free to pivot back upwardly to the position shown in FIG. 10 wherein the interengagement of the prong and lock member surfaces 50c and 35b will now block removal of the prong from the socket. The inside workman then lowers jack pad 62 and moves the air-jack back to the rail car door in readiness for the next automobile.

Thus, in response to forward movement of the automobile, by the workman and air-jack operating at the rear of the automobile, the securement system will stop the automobile at the desired point and automatically lock it in place. The socket and lock plate, together with the automobile wheels which have been set by the hand brake prior to loading, will hold the automobile against forward or rearward movement during transit. The interengaging vertical side surfaces 50d of shank 50 and the socket member surface 29a, as well as center guide member 46 will hold the automobile against sideward movement. The interengaged prong and socket surfaces 49 and 26a will hold the spring suspension system of the automobile in compression to prevent up-and-down movement of the automobile during transit.

While the inside workman is awaiting the next automobile he installs the next set of sockets 23 to runners 20 at the proper place to provide a small clearance between automobiles. During the time the inside workman is moving an automobile into position, removing the jack and installing the next sockets, the next automobile will have been spotted into place by the outside driver and picked up by the forklift truck.

As will be noted in FIG. 3, automobiles on opposite sides of the side door opening face in opposite directions, toward the ends of the rail car. This will require the automobile to be spotted outside the rail car so they are headed in the proper direction. Also, when the direction of the next-to-be-loaded automobile changes, the inside workman will run the air-jack to a gap in the central rail system to disengage the air-jack from the central rail so that it may be turned around and then be moved to position it at the rear of the next automobile.

Loading operations will continue as above until the next-to-last automobile has been loaded onto the deck. The inside workman and air-jack are then removed and moved to the next deck to be loaded. The last automobile on the deck is inserted through the open door and set down on the deck with the prongs 47 close to and in alignment with the sockets 23 which have been installed therefor. The lift truck is manipulated so that the tines move in unison to move the automobile forwardly so that the prongs enter the sockets 23 and are locked thereinto. The forklift tines are spread and removed.

The remaining decks are loaded in the same manner as above described. After the rail car has been fully loaded, the doors are closed and locked to prevent any unauthorized entry into the rail car. The three workmen then proceed to the next rail car to be loaded.

The unloading operations are essentially the reverse of the loading operations. The rail car doors are opened and a workman reaches inside and under the automobile by the doorway to release the locking lever 32. The forklift truck is manipulated to grip the tires and shift the automobile rearwardly, to remove the prongs 47 from the sockets, after which the automobile is picked up by the forklift trucks, removed from the rail car and set on the ground to be driven away by the driver.

The inside workman and air-jack are then put into the rail car, together with the unlocking tool 100. The unlocking tool 100, illustrated in FIGS. 12-15, comprises an elongated channel-shaped body 101 having a downwardly facing channel 102 adapted to fit down over center guide rail 18 and a laterally extending head 103 at one end to which forwardly-projecting rods 104 are secured. A wedge member 105 having a tubular socket 106 is telescoped onto each rod 104 and is biased away from head 104 by spring 107. Each wedge member 105 has an upwardly and rearwardly inclined cam surface 108 and a horizontal surface 109 extending rearwardly from the cam surface. The body 101 is provided with a laterally extending tail 110 at its other end for engagement by the front end of air-jack 19.

The inside workman places the unlocking tool 100 on the guide rail 18 at the rear of the automobile to be unlocked and moves the air-jack 19 towards the unlocking tool (FIG. 13). Forward movement of the air-jack after it engages the tail of the unlocking tool will move the tool forwardly until the cam surfaces 108 enter between the release stubs 34 of the unlocking levers 32 and the rail car deck. If the prong 47 is sufficiently forward in socket 23 so that the locking plate 35 is free to pivot, continued forward movement of the air-jack and unlocking tool will cause stub 34 to ride up cam surface 108 and then along horizontal surface 109 of the wedge so that the locking plate 35 will be pivoted from its upwards blocking position to its downward position wherein it will allow prong 47 to be removed from the socket (FIG. 16). The jack pad 62 is raised to elevate the braked rear wheels of the automobile off of the deck and the automobile is then moved rearwardly to adjacent the rail car door for removal.

If the automobile had shifted rearwardly during transit so that the locking plate 35 is not free to pivot to unlocked position (FIG. 15) movement of the air-jack to its final position will cause wedges 105 to telescope towards the unlocking tool head 103 and against the bias of springs 107 after the unlocking wedges have engaged the lever stubs 34. The jack pad 62 will be raised to elevate the rear wheels of the automobile and the automobile will be moved forwardly so that the prongs 47 move forwardly in the sockets. When the prongs have so moved, springs 107 will force the wedges 105 forwardly to cam stubs 34 upwardly and move the locking plate 35 to the unlocked position of FIG. 16, thereby allowing the automobile to be moved rearwardly to the rail car door.

After an automobile has been removed from the rail car, the inside workman removes the sockets 23 so the next automobile can be moved to the rail car door and places the unlocking tool in position to release the next car.

Operations are repeated until the entire rail car is unloaded, and the crew then moves to the next rail car to unload it.

Since all movement of the automobiles in the rail car is caused by the air-jack or forklift truck, the automobile engines are not needed until after the automobiles have been placed on the ground. As a consequence, there is no need to enter the automobiles when they are inside the rail car, there are no exhaust fumes in the rail car, and a dead battery or flat tire will not delay operations in the rail car.

The inside workman is always working in the space between the rear of a car and the rail car door and thus he never has to squeeze past the side of automobiles in the rail car. As a consequence, damage to the side of automobiles is eliminated.

In addition to the numerous advantages previously set forth of side loading as compared to end loading of automobiles, comparative time studies show that the total manhours required to load automobiles into a rail car by the side-loading method described herein is approximately 75% of that required by presently used end-loading operations.

The forklift truck 80 is preferably constructed as shown in the copending application of Benjamin F. Biaggini and Paul V. Garin, Ser. No. 646,941, filed Jan. 6, 1976, and entitled "LIFT TRUCK WITH AT- TACHMENT FOR CARRYING AUTOMOBILES", assigned to the assignee of the present application, and now U.S. Pat. No. 4,073,394 the disclosure of which is incorporated herein by reference.

What is claimed is:

1. Securement mechanism for releasably securing an automobile to a horizontal rail car deck in response to longitudinal movement of said automobile along said deck, said automobiles each having a frame spring-suspended on wheels, said securement mechanism comprising:
    a locking hook having a vertical shank and an elongated prong extending outwardly from the lower end of said shank,
    means for removably attaching said locking hook to and beneath the frame of said automobile whereby longitudinal movement of said automobile along said rail car deck will translate said prong along and above said deck,
    a socket member having spaced-apart top and bottom walls and spaced-apart side walls and open at at least one end for insertion of said prong into said socket,
    means for removably attaching said socket member to said rail car deck with said open end of said socket in the path of movement of said prong,
    means forming a downwardly facing surface on said prong and means forming an upwardly facing surface on said socket member, said surfaces being interengageable upon insertion of said prong into said socket to limit upward movement of said prong relative to said socket when inserted thereinto,
    means forming a vertical surface on said shank and means forming a vertical surface on said socket, said vertical surfaces being interengageable for limited movement of said prong into said socket,
    a lock member mounted on said socket member for movement between a first position blocking removal of said prong from said socket member when said prong is inserted into said socket member and a second position allowing said prong to be inserted and removed from said socket member,
    means biasing said lock member to its first position,
    means forming interengageable surfaces on said lock member and said prong for moving said lock member to its second position by said prong as said prong is inserted into said socket member.

2. Securement mechanism as set forth in claim 1 and further including:
    means forming interengageable vertical surfaces on said locking hook and said socket member for limiting sidewards movement of said locking hook relative to said socket member when said prong is inserted into said socket member.

3. Securement mechanism as set forth in claim 1 and further including:
    means forming interengageable cam surfaces on said prong and said socket member for moving said locking hook downwardly relative to said socket member during initial insertion of said prong into said socket.

4. Securement mechanism as set forth in claim 1 wherein said means for removably attaching said socket member to said rail car deck comprises means forming a slotted hole in said deck and a Tee-fastener on said socket member, said Tee-fastener having an elongated head passable through said slotted hole only when said head is aligned with the length of said slotted hole.

5. Securement mechanism as set forth in claim 4 and further including:
    means forming interengageable cam surfaces on said prong and said socket member for moving said locking hook downwardly relative to said socket member during initial insertion of said prong into said socket.

6. Securement mechanism as set forth in claim 5 and further including:
    means forming interengageable vertical surfaces on said locking hook and said socket member for limiting sidewise movement of said locking hook relative to said socket member when said prong is inserted into said socket member.

7. Securement mechanism as set forth in claim 1 wherein said socket member includes a horizontal shaft rotatably mounted in said side walls and wherein said lock member is mounted on said shaft for pivotal movement of said lock member between its first and second positions upon rotation of said shaft above its axis and wherein said means for biasing said lock member to its first position comprises a counterweight mounted on said shaft, said counterweight being movable downwardly by gravity to rotate said shaft and move said lock member to its first position.

8. Securement mechanism as set forth in claim 7 wherein said counterweight has a release member thereon spaced above said deck, said release member being movable upwardly relative to said deck to rotate said shaft to move said lock member to its second position.

9. Securement mechanism as set forth in claim 8 and further including an unlocking tool comprising a body slidable along said deck and a wedge mounted on said body, and means for guiding forward sliding movement of said body along said deck to enter said wedge between said deck and said release member.

10. Securement mechanism as set forth in claim 9 and further including means mounting said wedge on the body of said unlocking tool for limited forward and rearward movement of said wedge relative to said body and spring means biasing said wedge forwardly relative to said body.

* * * * *